United States Patent [19]

Oberle

[11] Patent Number: 4,855,183

[45] Date of Patent: Aug. 8, 1989

[54] MULTIPLE-LAYER, COOK-IN FILM

[75] Inventor: Timothy T. Oberle, Duncan, S.C.

[73] Assignee: W. R. Grace & Co.-Conn., Duncan, S.C.

[21] Appl. No.: 932,138

[22] Filed: Nov. 17, 1986

[51] Int. Cl.$^4$ .................................................. C09J 7/02
[52] U.S. Cl. ...................................... 428/345; 428/34.9; 428/36.7; 428/475.8; 428/476.3; 428/349; 426/129; 156/244.11
[58] Field of Search ................... 428/475.8, 476.3, 349, 428/345; 426/129; 156/244.11

[56] References Cited

U.S. PATENT DOCUMENTS

| | | | |
|---|---|---|---|
| 3,355,319 | 11/1967 | Rees | 428/346 |
| 3,741,253 | 6/1973 | Brax | 428/215 |
| 3,845,163 | 10/1974 | Murch | 260/857 |
| 4,136,205 | 1/1979 | Quattlebaum | 426/129 |
| 4,303,711 | 12/1981 | Erk et al. | 428/36 |
| 4,411,919 | 10/1983 | Thompson | 426/412 |
| 4,469,742 | 9/1984 | Oberle et al. | 428/215 |
| 4,568,580 | 2/1986 | Ghiradello et al. | 428/35 |
| 4,601,929 | 6/1986 | Erk et al. | 428/36 |
| 4,606,922 | 8/1986 | Schirmer | 426/412 |

FOREIGN PATENT DOCUMENTS 0104436  8/1983  European Pat. Off. .

*Primary Examiner*—Edith Buffalow
*Attorney, Agent, or Firm*—John J. Toney; William D. Lee, Jr.; Jennifer L. Skord

[57] ABSTRACT

Disclosed is a multiple-layer cook-in film from which packages such as bags or casings can be made. The films have a first food contact layer that bindingly adheres during cook-in to a contained meat product. The first layer comprises a polyamide composition, which is preferably (I) a polyamide or (II) a blend of a polyamide and (i) polyethylene, or a blend of a polyamide and (ii) a copolymer of an alpha-olefin having the formula $RHC=CH_2$ wherein R is H or $C_1$ to $C_8$ alkyl and an alpha,beta-ethylenically unsaturated carboxylic acid.

25 Claims, No Drawings

MULTIPLE-LAYER, COOK-IN FILM

BACKGROUND OF THE INVENTION

This invention relates generally to thermoplastic films suitable for cook-in packaging, and more particularly to cook-in food films having food contact surface characteristics which promote binding adherence to a contained food product during cook-in. The films of the invention exhibit improved heat seal strength as compared to known films having a Surlyn food contact layer that bindingly adheres during cook-in to a contained meat product.

The food packaging industry needs a packaging film from which bags and casings can be made which are of improved structural soundness such that they may be fully characterized as cook-in. Further, a precooked food product attractively packaged inside the film within which it was precooked is desirable. The term "cook-in" as used herein is intended to refer to packaging material structurally capable of withstanding exposure to cook-in time-temperature conditions while containing a food product. Cook-in packaged foods are essentially foods cooked in the package in which they are distributed to the consumer and which may be consumed with or without warming. Cook-in time-temperature conditions typically refer to a long slow cook, for example submersion in hot water at 55°-65° C. for 1–4 hours, and such conditions are representative of institutional cooking requirements. Submersion at 70°-100° C. for up to about 12 hours probably represents the limiting case. Under such conditions, a cook-in packaging material should maintain seal integrity, i.e. any heat sealed seams should resist being pulled apart during cook-in. As a corollary, the film is heat sealable to itself. Additionally, the packaging film is substantially conformable to the contained food product. Preferably, this substantial conformability is achieved by the film being heat shrinkable under these conditions so as to form a tightly fitting package. In other words, in an advantageous embodiment, the film is heat shrinkable under these time-temperature conditions, i.e. the film possesses sufficient shrink energy such that submerging the packaged food product in hot water will shrink the packaging film snugly around the contained product, representatively up to about 55% monoaxial or biaxial shrinkage.

Also, the film should have food product adherence to restrict "cook-out" or collection of juices between the surface of the contained food product and the food contact surface of the packaging material during cook-in, thereby increasing product yield. More particularly, in the types of multi-layer films wherein the first "sealing and food contact" layer is of the type of material that bindingly adheres to a contained food product during cook-in, this first layer may alternatively be referred to as the "adhering layer". As used herein, the term "adhere" is intended to mean that the food contact surface of the film bonds during cook-in to the contained food product to an extent sufficient to substantially prevent accumulation of fluids between the film and the contained product.

A heat-shrinkable, cook-in film is described in U.S. Pat. No. 4,469,742 (1984) to Oberle et al. This patent relates to a cook-in shrink film that includes a first "sealing or food contact" layer of nonlipophillic polymeric material having a softening point greater than that of the following shrink layer; a second or shrink controlling layer, melt bonded to the first layer, of an ethylene homopolymer or copolymer; a third or adhesive layer, melt bonded to the second layer, of a chemically modified polyethylene being irradiatively cross-linkable and having functional groups with a relatively strong affinity for the following barrier layer; a fourth or barrier layer, melt bonded to the third layer, of a hydrolyzed ethylene-vinyl acetate copolymer; a fifth or adhesive layer as in said third layer, melt bonded to the fourth layer; and a sixth or abuse layer, melt bonded to the fifth layer. In one embodiment, the first "sealing and food contact" layer is a metal salt neutralized copolymer of an olefin and a carboxylic acid, representatively Surlyn (TM). This patent explains Surlyn is the type of material that bindingly adheres to a contained meat product during cook-in. Thus, this Surlyn layer also functions as a protein-adhering layer. The patent also describes a method for making the film including full coextrusion and selective irradiation and orientation.

In the conventional method of manufacturing heat shrinkable film as described in the Oberle et al patent, a tubular orientation process is utilized wherein a primary tube of the film is biaxially oriented by stretching with internal pressure in the transverse direction and with the use of pinch rolls at different speeds in the machine direction. Then the stretched bubble is collapsed, and the film is wound up as flattened, seamless, tubular film to use later to make bags, e.g. either end-seal bags typically made by transversely heat sealing across the width of flattened tubing followed by severing the tubing so that the transverse seal forms the bag bottom, or side-seal bags in which the transverse heat seals form the bag sides and one edge of the tubing forms the bag bottom. Such bags are typically used by placing the food product in the bag, evacuating the bag, either heat-sealing the bag mouth or gathering and applying a metal clip around the gathered mouth of the bag to form a seal, and then immersing the bag in hot water at approximately the same temperature at which the film was stretch-oriented, typically about 160° to 205° F. (61° to 96° C.), hot water immersion being one of the quickest and most economical means of transferring sufficient heat to the film to shrink it uniformly. Alternatively, the bag may serve as a liner of a cooking mold.

Also of interest is a plastic, adhering cook-in package such as the casing described in U.S. Pat. No. 4,606,922 (1986) to Schirmer, relating to a method for enhancing yield of a cook-in packaged meat product that includes first providing an adhering cook-in container including a flexible thermoplastic envelope being substantially conformable to a contained meat product and having an inner meat-contacting surface of a selectively irradiated ionomer of a metal salt neutralized copolymer of ethylene and acrylic acid or meth-acrylic acid, then conforming the container about a selected meat product and cooking the packaged product, whereupon the inner surface of the envelope bonds to the meat product substantially to prevent cook-out of fluids. Representatively, the ionomer of the inner binding surface is Surlyn, and a typical casing or envelope is of the structure: nylon 6/adhesive/Surlyn.

Also of interest is a flexible plastic, adhering cook-in package described in U.S. Pat. No. 4,411,919 (1983) to Thompson, relating to a method for enhancing yield of cook-in packaged meat product, comprising: (a) providing an adhering cook-in package comprising a flexible plastic container being substantially conformable to a selected meat product and having an inner meat product contacting surface of polymeric olefin having been subjected to an energetic radiation surface treatment in the presence of oxygen sufficient to cause said inner surface to adhere to the meat product during cook-in, said container having been formed from hot blown tubular film; (b) conforming said package about a selected meat product; and (c) cooking the packaged product, whereupon said inner surface adheres to said meat product to substantially prevent cook-out of fluids therefrom.

Also of interest is the film described in U.S. Pat. No. 4,303,711 (1981) to Erk and Korlatzki, which relates to a tubular film consisting of biaxially stretched plastic material for packing and casing paste-type foodstuffs that either, after packing, are heated or are packed in a hot fluid state, comprising a mixture of approximately 50–99 parts by weight of at least one aliphatic polyamide having a glass transition point in the dry state of at least 48° C., and a glass transition point after moisture absorption of 3° C. or less and approximately 1–50 parts by weight of one or more members of the group consisting of an ionomer resin, a modified ethylene/vinyl acetate acid copolymer and a modified polyolefin. Another patent to Erk and Korlatzki is U.S. Pat. No. 4,601,929 (1986), relating to a single layer of polyamide film for packing and casing foodstuffs in paste form, especially foodstuffs that are packed when hot or are subject to heat treatment after packing.

Also of interest is the film described in U.S. Pat. No. 4,568,580 (1986) to Ghiradello et al, relating to an article of manufacture for packaging food products comprising: (a) a first film section, said section having at least one surface comprising a copolyamide obtained by random copolymerization of precursor monomers of at least two different polyamides, said copolyamide having a melting point measured on a Perkin Elmer DSC-2 device in the range from 120° C. to 240° C.; (b) a second film section, said section being a section of a film having surface comprising a copolyamide as defined in subparagraph (a) above; and, (c) at least one heat weld between the copolyamide surfaces of said first and second sections thereby forming said articles for packaging food products, said article being capable of withstanding, without suffering damage to said heat weld, heat treatment at temperatures from 70° C. to 120° C. for at least 10 minutes.

Of general interest are the disclosures of U.S. Pat. No. 3,355,319 issued Nov. 28, 1967 to Rees for "Self-Supporting Film With A Heat-Sealable Coating Of An Ionic Copolymer Of An Olefin And Carboxylic Acid With Metal Ions Distributed Throughout" and U.S. Pat. No. 3,845,163 issued Oct. 29, 1974 to Murch for "Blends of Polyamides and Ionic Copolymer". Both of these patents are assigned to E. I. du Pont de Nemours and Company, and relate to metal salt neutralized copolymers of an alpha-olefin having the formula $RHC=CH_2$ wherein R is H or $C_1$ to $C_8$ alkyl and an alpha,beta-ethylenically unsaturated carboxylic acid. Such materials are marketed by du Pont under the name, Surlyn (TM).

The present invention is directed to multiple-layer cook-in film from which packages, such as casings or bags, can be made which exhibit improved heat seal strength, yet still retain at least some food adherence characteristics and often exhibit similar or improved food adherence characteristics as compared to known films having a Surlyn food contact surface that adheres to a food product during cook-in, such as some of the films described in U.S. Pat. No. 4,606,922 and some of the films described in U.S. Pat. No. 4,469,742, both of which are discussed above. The multilayer film structure of the present invention has a "sealing and food contact" layer, more preferably has the minimal structure: (sealing and food contact layer)/(barrier layer), in one advantageous embodiment has the minimal structure: (sealing and food contact layer)/(barrier layer)/(abuse layer), and in another advantageous embodiment has the minimal structure: (sealing and food contact layer)/(shrink layer)/(barrier layer)/(abuse layer), such composite structures being advantageous to achieve the desired composite properties of the packaging film.

SUMMARY OF THE INVENTION

Accordingly, there is provided a multiple-layer, cook-in film having a first food contact layer having been subjected to an energetic radiation surface treatment, said first layer functioning as an adhering layer, and wherein said first layer comprises a polyamide composition. In an advantageous embodiment, the composition is selected from (I) a polyamide or (II) a blend comprising about 60% up to about 100% by weight polyamide with about 40% down to about 0% by weight (i) polyethylene, or (ii) copolymer of an alpha-olefin having the formula $RHC=CH_2$ wherein R is H or $C_1$ to $C_8$ alkyl and an alpha,beta-ethylenically unsaturated carboxylic acid.

Also, there is provided a method for improving the heat seal strength of multiple layer, cook-in film having a first food contact layer (a) that functions as an adhering layer, said method comprising (1) providing for said first layer (a) with a polyamide composition (2) extruding said first layer into a multiple layer film, and (3) prior to or after the extruding of said first layer (a), subjecting said first layer (a) to an energetic radiation surface treatment. In an advantageous embodiment, said polyamide composition in said first layer (a) is provided by (I) a polyamide or (II) a blend comprising by weight about 60% up to about 100% polyamide with about 40% down to about 0% (i) polyethylene, or (ii) copolymer of an alpha-olefin having the formula $RHC=CH_2$ wherein R is H or $C_1$ to $C_8$ alkyl and an alpha,beta-ethylenically unsaturated carboxylic acid.

DETAILED DESCRIPTION OF THE INVENTION

The First Food Contact Or Adhering Layer

The cook-in film may be made from any of a variety of multi-layer cook-in packaging films so long as the first food contact layer of the film comprises a polyamide composition. In an advantageous embodiment, the composition in said first layer is (I) a polyamide or (II) a blend comprising about 60% up to about 100% by weight polyamide with about 40% down to about 0% by weight (i) polyethylene, or (ii) copolymer of an alpha-olefin having the formula $RHC=CH_2$ wherein R is H or $C_1$ to $C_8$ alkyl and an alpha,beta-ethylenically unsaturated carboxylic acid. Preferably when there is present in the polyamide composition a component that is a copolymer of olefin and carboxylic acid, the olefin is ethylene and the carboxylic acid is acrylic acid or methacrylic acid.

The first food contact layer desirably has a thickness of about 0.2 to 1.0 mils (about 5 to 25 micrometers) for a suitable multi-layer cook-in packaging film. The food contact layer to bonds or adheres to the contained meat product during cook-in, thereby preventing cook-out of fluids from the contained meat product. Thus, the food contact layer is alternatively referred to as the adhering layer.

The food contact layer must be subjected to an energetic radiation surface treatment, including, but not limited to corona discharge, plasma, flame, ultraviolet, and high energy electron treatment. While it is not known for sure and thus it is not intended to limit the invention "causally" thereby, it is believed the energetic radiation surface treatment "causes" the food adhering characteristics. For instance, the food contact layer may be selectively irradiated with high energy electrons which advantageously may be accomplished during irradiation of the overall multi-layer film structure for cook-in integrity, as further discussed below. A suitable radiation dosage of high energy electrons is in the range of up to about 12 megarads (MR), more preferably about 2-9 MR. Radiation dosages are referred to herein in terms of the radiation unit "RAD", with one million RADS or a megarad being designated as "MR".

The polyamides employed in the first food contact layer of the films of this invention are well known in the art and embrace those resins commonly designated as nylons. Typically, in the conventional method, some polyamide resins are made by condensation of equimolar amounts of a saturated dicarboxylic acid containing from about 2 to 10 carbon atoms with an alkylene diamine, in which the alkylene group contains from about 2 to 10 carbon atoms. Excess diamine may be used, thereby giving an excess of amine end groups over carboxyl end groups in the polyamide. Other polyamide resins are polymerized by addition reactions of ring compounds that contain both acid and amine groups on the monomer. Examples of suitable polyamides include, but are not limited to, polycaprolactam (nylon 6), (nylon 6/9), (nylon 6/10), the polycondensation product of hexamethylenediamine and a 12-carbon dibasic acid (nylon 6/12), the polymerization product of lauric lactam of cyclododecalactam with 11 methylene units between the linking —NH—CO— groups in the polymer chain (nylon 12), the polyaddition product of the monomer 11-aminoundecanoic acid (nylon 11), polyhexamethylene adipamide (nylon 66), (nylon 69), polyhexamethylene sebacamide (nylon 610), and (nylon 612). It is also possible to use in this invention polyamides prepared by the copolymerization of two of the above polymers or terpolymerization of the above polymers or their components. A very desirable nylon is Versamid (TM), which is a nylon 12 supplied by Chemische Werke Huls AG, Germany. Also, Rilsan® nylon 11 or Rilsan® nylon 12, supplied by Atochem, Inc., Polymers Division, Glen Rock, N.J., may be advantageously employed. Also, Grilamid (TM) nylon 12 from Emser Industries, Sumter, S.C. may be advantageously employed.

Suitable "polyethylenes" employed in the first food contact layer (or in another layer as discussed below) are the families of resins obtained by substantially polymerizing the gas ethylene, $C_2H_4$. By varying the comonomers, catalysts and methods of polymerization, properties such as density, melt index, crystallinity, degree of branching and cross-linking, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc, more preferably to about 0.928 g/cc, are called low density polyethylenes (LDPE), while those having densities from about 0.936 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein for a type of polyethylene employed in the first food contact layer (or another layer) refers to the newer copolymers of ethylene with one or more comonomers selected from $C_4$ to $C_{10}$ alpha olefins such as butene-1, pentene-1, hexene-1, octene-1, etc. in which the molecules thereof comprise long chains with few side chains or branches achieved by low pressure polymerization. the side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density in the range from about 0.911 g/cc to about 0.935 g/cc, more pre-ferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts. LLDPE is well known for its structural strength and anti-stress-cracking properties. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein for a type of polyethylene refers to a copolymer formed from ethylene and vinyl acetate monomers wherein the ethylene derived units in the copolymer are present in major amounts and the vinyl acetate derived units in the copolymer are present in minor amounts. EVA is known not only for having structural strength, as LLDPE does, but also it is known for providing excellent adhesion to an adjacent layer, which may decrease or even obviate the need for an "adhesive".

The term "ethylene-methylacrylate copolymer" (EMA) as used herein for a type of polyethylene, refers to a copolymer formed from ethylene and methylacrylate monomers.

The term "ethylene-ethylacrylate copolymer" (EEA) as used herein for a type of polyethylene, refers to a copolymer formed from ethylene and ethylacrylate monomers.

The term "ethylene butyl acrylate copolymer" (EBA) as used herein for a type of polyethylene, refers to a copolymer formed from ethylene and butyl acrylate monomers.

Blends of all families of polyethylenes, such as blends of EVA, EMA, EEA, EBA, VLDPE, and LLDPE, may also be advantageously employed.

The copolymer of an alpha-olefin having the formula $RHC-CH_2$ wherein R is H or $C_1$ to $C_8$ alkyl and an alpha,beta-ethylenically unsaturated carboxylic acid which may be employed in the first food contact layer of the films of this invention representatively may be one of the Primacor (TM) polymers, supplied by Dow Chemical Company, Midland, Mich. Primacor is produced by the free radical copolymerization of ethylene and a carboxylic acid comonomer therefor such as acrylic acid or methacrylic acid. A very suitable Primacor polymer is Primacor 1410. Also, the copolymer of an alpha-olefin having the formula $RHC=CH_2$ wherein R is H or $C_1$ to $C_8$ alkyl and an alpha,beta-ethylenically unsaturated carboxylic acid may be metal salt neutralized. Thus, the copolymer may be an ionomer. Representatively, such an ionomeric material is commercially available as Surlyn (TM) from the E. I. du Pont de Nemours Company of Wilmington, Del., and is described in detail in U.S. Pat. No. 3,355,319 and U.S. Pat. No. 3,845,163, both of which are cited above.

As discussed above, the first food contact layer of the film comprises a polyamide composition; and in an advantageous embodiment the composition is selected from (I) a polyamide or (II) a blend comprising about 60% up to about 100% by weight polyamide with about 40% down to about 0% by weight (i) polyethylene, or (ii) copolymer of an alpha-olefin having the formula $RHC=CH_2$ wherein R is H or $C_1$ to $C_8$ alkyl and an alpha,beta-ethylenically unsaturated carboxylic acid.

As further illustrated in Example I below, in the embodiments involving blends comprising polyamide with (ii) copolymer, those blends having about 55% or less polyamide exhibit poor heat-seal strength. Furthermore, there is a trade off in choosing a polyamide free of the copolymer versus choosing a blend of polyamide with the copolymer for the first layer of the film of the present invention, although all such films exhibit a heat-seal strength superior to those known films having a first (sealing-adhering-food contact) layer of Surlyn copolymer of olefin and carboxylic acid. When the first layer is a polyamide free of the copolymer, heat-seal strength is comparable to when the first layer is a blend, as is further illustrated in Example I below. On the other hand, when the first layer is a polyamide free of the copolymer, food adherence characteristics are still retained but they are inconsistent as compared to when the first layer is a blend, as is further illustrated in Example II below. Accordingly, in this embodiment, the first layer desirably comprises by weight about 60% up to about 100% polyamide and about 40% down to about 0% copolymer. More desirably, the first layer comprises by weight about 70% to about 90% polyamide and about 30% to about 10% copolymer.

In the embodiment wherein the first food contact layer is a blend comprising polyamide with (i) polyethylene or with characteristics obtained by stretching and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction uniaxial orientation results. When the stretching force is simultaneously applied in two directions biaxial orientation results. The term "oriented" is also herein used interchangeably with the term "heat shrinkable" with these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

Returning to the basic process for manufacturing the film as discussed above, it can be seen that the film, once coextruded and initially cooled to by, for example, cascading water quenching, is then reheated to within its orientation temperature range and oriented by stretching. The stretching to orient may be accomplished in many ways such as, for example, by "blown bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to cool the film rapidly and thus set or lock-in the oriented molecular configuration.

Of course, if a film having little or no orientation is desired, e.g. non-oriented or non-heat shrinkable film, the film may be formed from a non-orientable material or, if formed from an orientable material may be "hot blown". In forming a hot blown film the film is not cooled immediately after extrusion or coextrusion but rather is first stretched shortly after extrusion while the film is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

Whichever film has been made (the non-oriented molecular configuration or the stretch-oriented molecular configuration), it may then be subjected to an energetic radiation surface treatment, which is advantageously provided by a high energy electron treatment. For instance, it may be irradiated, for example by guiding it through the beam of an electron accelerator to receive a radiation dosage up to about 12 megarads (MR), move preferably a dosage in the range of about 2-9 megarads (MR), and then it may be stored in rolls and utilized to package a wide variety of items. In this regard, the product to be packaged may first be enclosed in the material by heat sealing the film to itself where necessary and appropriate to form a pouch or bag and then inserting the product therein. If the material was manufactured by "blown bubble" techniques the material may still be in tubular form or it may have been slit and opened up to form a sheet of film material. Alternatively, a sheet of the material may be utilized to over-wrap the product. These packaging methods are all well known to those of skill in the art.

If the material is of the heat shrinkable type, then thereafter the enclosed product may be subjected to elevated temperatures, for example, by passing the enclosed product through a hot air or hot water tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bag or pouch forming methods, likewise, are well known to those of skill in the art.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, multiple layers may be first coextruded with additional layers thereafter being extrusion coated thereon. Or two multi-layer tubes may be coextruded with one of the tubes thereafter being extrusion coated or laminated onto the other. The extrusion coating method of film formation is preferable to coextruding the entire film when it is desired to subject one or more layers of the film to a treatment which may be harmful to one or more of the other layers. Exemplary of such a situation in a case where it is desired to irradiate with high energy electrons one or more layers of a film containing a barrier layer comprised of one or more copolymers of vinylidene chloride (i.e. saran), such as of vinylidene chloride and vinyl chloride or such as of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion followed by high energy electron irradiation of the multilayer structure is carried out on a film having a barrier layer containing a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, other later layers (which may or may not have been irradiated) sequentially onto the outer surface of the extruded previously irradiated tube. This sequence allows for the high energy electron irradiative treatment of the first and later layer or layers without subjecting the saran barrier layer to the harmful discoloration effects thereof.

Thus, as used herein the term "extrusion" or the term "extruding" is intended to include coextrusion, extrusion coating, or combinations thereof.

One Embodiment (A Film For A Food Casing)

One representative embodiment of the invention is a multi-layer film for a tubular food casing having an outside nylon layer over one or more other layers, and having a Surlyn and nylon blend as the food contact inner surface, for example the structure: (food contact and inside) blend of Surlyn and nylon/adhesive/(outside) nylon. The Surlyn and nylon blend food-contact inner surface functions as a food adhering material. Nylon 6 or nylon 66 is preferred for the outside layer, as these materials not only serve as a fluid barrier, such as an oxygen barrier, but also impart high stuffing strength to the casing. Accordingly, the outside nylon 6 or nylon 66 layer functions both as a barrier layer and as an abuse layer. In addition to irradiatively treating the food contact layer, the adhesive layer desirably is also irradiated, to cross-link it for enhanced cook-in structural integrity. Any of the various adhesives well known in the art of film making may be employed. Some representative adhesives that are suitable are those adhesives that comprise a chemically modified polyolefin selected from the group consisting of ethylene-vinyl acetate copolymer, high density polyethylene and rubber modified high density polyethylene, each chemically modified by the provision of functional groups which will form a strong bond to the adjacent layer, herein nylon, under heat and pressure of coxtrusion, such strong bonding being representatively shown in U.S. Pat. No. 4,233,367. The preferred adhesives are the acid anhydride grafted polyethylenes such as the Plexar (TM) adhesives (most preferably Plexar-3 adhesive), supplied by Chemplex Company of Rolling Meadows, Ill., which adhesives are further discussed herein below. The blend of Surlyn and nylon in the first food contact or adhering layer is made as discussed above.

Another Embodiment (A Heat Shrinkable Film)

Another representative embodiment of the invention is a composite tubular film having the multilayer structure: (inside) A/B/C/D/C/E (outside) where A is primarily a food contact layer, B is primarily a shrink layer, C is primarily an adhesive layer, D is primarily a barrier layer, and E is primarily an abuse layer. This film, when in a tubular configuration, is especially suited for bag making. The material of layer A (the first food contact layer) is made as discussed above and is representatively a blend of a polyamide with an ionomer of a metal salt neutralized copolymer of an alpha-olefin having the formula $RHC=CH_2$ wherein R is H or $C_1$ to $C_8$ alkyl, preferably ethylene, and an alpha,-beta-ethylenically unsaturated carboxylic acid, preferably acrylic acid or methacrylic acid. Accordingly, this first layer A is alternatively referred to as the adhering layer. Layer B, the second layer, being a shrink layer, is typically melt bonded to the first layer and is representatively an ethylene homopolymer or copolymer such as an ethylene-vinyl acetate copolymer (EVA), an ethylene-butyl acetate copolymer (EBA), a linear low density polyethylene (LLDPE), a blend of EVA and LLDPE, a blend of EBA and LLDPE, very low density polyethylene (VLDPE), Plexar, or a blend of Plexar and LLDPE. The term "shrink layer" is intended to refer to the shrink controlling layer that initiates compatible shrinkage, i.e. during hot water immersion, of the overall multilayer structure. The relative thickness of the shrink layer is selected as being sufficient relative to that of the overall film thickness such that the shrink temperature of the shrink layer controls the shrinkage of the entire multi-layer film, when oriented. Barrier layer D is representatively composed of Saran (a vinylidene chloride copolymer) layer, a hydrolyzed ethylene-vinyl acetate copolymer (EVOH) layer, or both a saran layer and an EVOH layer. When the barrier layer is composed of both a saran layer and an EVOH layer, a suitable adhesive may be employed between them. Adhesive interlayers C are melt bonded adjacent the barrier layer to provide delamination resistance of the barrier layer in the tubular film under cook-in conditions. The adhesive may be any of the various adhesives well known in the art of film making. Representatively, a suitable adhesive is composed of a copolymer or a homopolymer of olefin (preferably that is cross-linkable such as by irradiation) that has been modified to provide functional groups with a relatively strong affinity for adjacent layer, i.e. the barrier material. Preferably, the adhesive is Plexar (TM) adhesive commercially available from the Enron Chemical Company. Abuse layer E isolates the barrier layer from adverse moisture contact and representatively is an ethylene-vinyl acetate copolymer having a vinyl acetate content of up to about 25% preferably about 5–12%, more preferably about 6%, or a blend thereof with LLDPE or VLDPE. All layers within the film are typically melt bonded to the respective adjacent layers. Representatively, the film will have an overall thickness prior to orientation of about 10–30 mils (about 254–762 micrometers), food contact layer A will have a thickness of about 2–6 mils (about 51–152 micrometers), shrink layer B about 4–8 mils (about 102–203 micrometers), adhesive layers C about 0.25–1.5 mils (about 6.3–76 micrometers) each, barrier layer D about 0.75–2 mils (about 19–102 micrometers), and abuse layer E about 3–8 mils (about 76–203 micrometers).

In the embodiment wherein the film of the invention is a shrink film having a barrier layer comprising EVOH, the film may be made by a tubular process similar to that described for the Oberle et al patent, cited above, wherein the tubular film is fully coextruded, i.e. all layers are simultaneously coextruded, using the conventional blown bubble technique. Full coextrusion is advantageous in that all layers of the multi-layer film are directly melt joined for enhanced interlayer strength under cook-in conditions. After cooling, the coextruded tube is flattened and then guided through an ionizing radiation field, for example through the beam of a high energy electron accelerator to receive a radiation dosage in the range of up to about 12 megarads (MR). Irradiation via this high energy electron treatment of the overall multi-layer film structure achieves the required energetic radiation treatment of the food contact layer. As the film in this embodiment is a heat shrinkable film, in general, irradiation should be sufficient to cross-link the irradiatively cross-linkable layers of the film to increase strength of the shrink layer without substantially diminishing elongation properties, and to provide delamination resistance of the film during cook-in conditions. After irradiation, the tube is then fed into a hot water tank having water at about 190°–212° F. (88°–100° C.) to soften the film for orientation; then it passes through pinch rolls and is inflated into a bubble and stretched to a point where the film thickness is representatively 2 mils (about 51 micrometers). Suitable thickness will range from about 1–4 mils (about 25–102 micrometers) with a stretch ratio of about 5–12:1, which will impart a shrink capacity of up to about 55% biaxial free shrinkage at 185° F. (85° C.) (by ASTM D2732). As the stretched bubble emerges from the hot water tank it cools rapidly in the air and then is collapsed and rolled up into flattened tubing. It is from this tubing of this final oriented thickness that bags are made as discussed above.

In use, bags are made from the heat-shrinkable film, as discussed above, to form either end-seal or side-seal bags. Eventually, the bags are loaded with a food product, vacuumized and sealed, and subjected to cook-in treatment in near boiling water. During this food treatment, (1) bags (a) maintain good seal integrity, (b) do not delaminate and (c) heat shrink to form a neatly packaged pretreated food product, and (2) the first food contact layer (the inner layer of the bag) bindingly adheres to the contained food product to enhance weight yield of the cooked food product.

More particularly, the second or shrink layer B may be an ethylene homopolymer or copolymer such as linear low density polyethylene (LLDPE), low density polyethylene (LDPE), very low density polyethylene (VLDPE), ethylene-vinyl acetate copolymer (EVA), a blend of VLDPE or LLDPE and EVA, ethylene-butyl acrylate copolymer (EBA), a blend of EBA and VLDPE or LLDPE, ethylene-methylacrylate copolymer (EMA), or a blend of EMA and VLDPE or LLDPE. Also, the second layer may be an acid anhydride grafted polyethylene such as Plexar or may be a blend of Plexar and LLDPE. Since Plexar may also be employed as the adhesive layer, either for this embodiment comprising a shrink film or for the embodiment discussed above comprising a film having the structure: (food contact or inside) blend of Surlyn and nylon/adhesive/(outside) nylon, further comments about Plexar are in the paragraph below discussing the adhesive layer. When the shrink layer is EVA, preferably, the shrink layer is composed of EVA having a vinyl acetate content in a range of up to about 25%, more preferably about 6–12%, most preferably about 6%, with the orientation temperature generally decreasing and shrink capacity increasing as the vinyl acetate content is increased. However, the melt temperature of EVA tends to decrease as the vinyl acetate content increases so that a maximum content of up to about 12% is desirable with a melting temperature of about 95° C. Irradiative cross-linking corresponding to a dosage of up to about 12 MR provides sufficient cross-linking in the shrink layer to enable production of the tubular film and orientation by the blown bubble technique at economic production rates.

More particularly, layer D (the barrier layer) may be composed of a layer comprising vinylidene chloride copolymer, composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. Preferably, the barrier layer is composed of a layer comprising EVOH, and the mole percent of vinyl acetate prior to hydrolysis should be at least about 29%, since for lesser amounts the effectiveness of the hydrolyzed copolymer as a barrier to fluids such as gas is substantially diminished. It is further preferred that the EVOH copolymer have a melt flow being generally compatible with that of the other components of the multilayer film, preferably in the range of about 3-10 (melt flow being determined generally in accordance with ASTM D1238). The gas of main concern is oxygen and transmission is considered to be sufficiently low, i.e. the material is relatively gas impermeable, when the transmission rate is below 70 cc/m$^2$/mil thickness/24 hours/atms, as measured according to the procedures of ASTM Method D-1434. The barrier layer of the multilayer film of this shrink film embodiment of the present invention has a transmission rate below this value. EVOH is advantageously utilized in the film of the invention since irradiative high energy electron treatment of the fully coextruded film does not degrade an EVOH barrier layer, as could be the case for a vinylidene chloride copolymer barrier layer. If a vinylidene chloride copolymer is employed instead of or together with EVOH as the barrier layer, then the necessary energetic radiation treatment for the food contact layer preferably should take place prior to application of the saran layer to avoid degradation thereof, which application may be achieved by well known extrusion coating methods, as discussed above.

The adhesive interlayers C may be any of the various adhesives well known in the art of film making. More particularly, the adhesive interlayers C melt bonded adjacent the barrier layer are composed generally of a copolymer or homopolymer of olefin which is modified by the provision of functional groups having a strong affinity for the barrier layer and which will form a strong bond under the heat and pressure of coextrusion. Preferably, it is cross-linkable, such as by irradiation. Preferably, the adhesive is one of the Plexar (TM) adhesives commercially available from the Chemplex Company of Rolling Meadows, Ill. Generally, Plexar adhesive is composed of an acid anhydride grafted polyethylene being irradiatively cross-linkable. Plexar adhesives are described in detail in U.S. Pat. Nos. 4,087,587 and 4,087,588. Plexar-2 adhesive may generally characterized as an adhesive of the type comprising blends of a graft copolymer of a high density polyethylene and at least one unsaturated, fused ring, carboxylic acid anhydride, blended with one or more resin copolymers of ethylene and an ethylenically unsaturated ester. Plexar-3 is preferred which comprises blends of a graft copolymer of a high density polyethylene and at least one unsaturated fused ring carboxylic acid anhydride, blended with a polyethylene resin of one of more homopolymers of ethylene, copolymers of ethylene and an alpha-olefin or any or all of these. Another suitable adhesive is Admer LF500 (TM) commercially available from the Mitsui Company which comprises a low density polyethylene chemically modified with phthalic acid to an extent sufficient for the above stated function. The adhesive layer is cross-linked, preferably by irradiation. Another suitable adhesive is Bynel CXA E-162, supplied by du Pont. It is an EVA having a vinyl acetate content of about 18% blended with a grafted polyethylene.

More particularly, the outer layer E may be an abuse layer, provided to isolate the preferred EVOH barrier layer D from moisture contact and thereby to prevent degradation in barrier properties. The abuse layer may be composed preferably of an ethylene homopolymer or copolymer such as EVA or a blend of EVA and LLDPE as discussed above for the foregoing shrink layer. When the abuse layer is composed of EVA, preferably the vinyl acetate content is up to about 25%, more preferably about 5-12%, most preferably about 6%. Alternatively, the outer abuse layer may be the same as the sealing layer A, this configuration being appropriate for form/fill/seal packaging wherein heat sealing is done on overlapped edge portions of a sheet of film.

The resins or basic polymeric materials fed into the extruders to make the film of the present invention are widely available and can be purchased from any of a number of suppliers, for example those identified in trade publications such as *Modern Plastics Encyclopedia.*

The following examples illustrate the preferred embodiments of the invention. It is not intended to limit the invention thereby.

EXAMPLES

In the data Tables, a number of samples are presented. Bags were prepared of the various film types indicated in the Tables by the conventional tubular, blown bubble, coextrusion method substantially as described above for the 6-layer shrink film of the structure: A/B/C/D/C/E, wherein A is the first food contact layer, B is the shrink layer, layers C are the adhesive layers, D is the barrier layer and E is the outside layer. Only those compositions which could be successfully processed by this method into film heat sealed in bag form are shown in the Tables. In all samples, layers C are Plexar-3, layer D is EVOH, and layer E is a blend of 80% EVA and 20% LLDPE by weight. Layers A and B very as designated in the Tables. The Surlyn (TM) employed in Layer A was supplied by E. I. du Pont de Nemours. The Primacor (TM) employed in Layer A was Primacor 1410 supplied by Dow Chemical Company. The nylon employed in Layer A was Versamid (TM), which is marketed by supplier Chemische Werke Huls, Germany, and is a nylon 12. The EVA employed in Layer B, in one of the samples was Petrothene ® NA 295 supplied by U.S. Industrial Chemicals Company, Cincinnati, Ohio, a division of National Distillers and Chemical Corp. The Plexar employed in Layer B in several of the samples was Plexar-3, supplied by Enron Chemical Company (formerly Chemplex). The LLDPE employed in layer A and/or Layer B of several of the samples was Dowlex (TM) 2045.03 supplied by Dow Chemical Company of Midland, Mich. The percentages of these materials employed are based on % by weight. In all samples, the film was irradiated in an electron beam under a dosage of about 4 megarads (MR). The film samples had multilayer dimensions prior to orientation of about 4 mils (about 102 micrometers) for the food contact layer, about 5 mils (about 127 micrometers) for the shrink layer, about 1.25 mils (about 132 micrometers) for the first adhesive layer, about 1.25 mils (about 132 micrometers) for the barrier layer, about 1.25 mils (about 132 micrometers) for the second adhesive layer, and about 5 mils (about 127 micrometers) for the outside layer. Tubular film samples following irradiation were biaxially oriented corresponding to a stretch ratio of about 7.5:1 for a final overall film thickness of about 2.4 mils (about 61 micrometers). The film was made into end seal bags.

EXAMPLE I

Heat Seal Strength

Two sets of bags were used in this example, so that for each sample number as indicated in Table I below, there would be a first set of bags for testing at 182° F. (83° C.) and a second set for testing at 73° F. (23° C.) (room temperature).

All bag samples were heat sealed at one end on conventional equipment well known in the art of heat sealing of tubing, and a mouth end of each bag was left open.

However, prior to heat sealing the first set of bags for the 83° C. test, the inside surface of the heat seal area was smeared with a thin layer of peanut oil. Peanut oil was used to simulate the fats and oils present in many food products.

Each bag of both sets was then clamped in a fixture provided with a hose. The open mouth end of each bag was clamped around the hose. Air was pumped through each hose whereby each bag was inflated to the same initial pressure. Then, for the first set of bags, each fixture lowered the heat sealed end of each inflated bag approximately 5 cm into a hot water bath at 83° C. For the second set of bags, each fixture retained each inflated bag in air at 23° C. and two sides of each bag were respectively restrained by two metal plates spaced about 10 cm apart. For each bag of both sets, the pressure was increased via the hose at the rate of 1 inch of water pressure (2491 dynes/cm$^2$) per second till the heat seal for that bag either leaked or burst open at the IOWP (inches of water pressure) designated in Table I below.

TABLE I

| Film Type Sample Number | Food Contact Layer A | Layer B | IOWP at Burst or Leak (83° C.) | IOWP at Burst or Leak (23° C.) |
|---|---|---|---|---|
| 1 | 90% nylon 12 10% Surlyn | Plexar-3 | 76 | 182 |
| 2 | 80% nylon 12 20% Surlyn | Plexar-3 | 73 | 204 |
| 3 | 70% nylon 12 30% Surlyn | Plexar-3 | 65 | 193 |
| 4 | 75% nylon 12 25% Surlyn | 80% EVA 20% LLDPE | 65.9 | 161 |
| 5 | 75% nylon 12 25% Surlyn | 50% Plexar-3 50% LLDPE | 67.7 | 172 |
| 6 | 75% nylon 12 25% Surlyn | Plexar-3 | 66.9 | 186 |
| 7 | 75% nylon 12 25% Primacor | Plexar-3 | 61.9 | 199 |
| 8 | nylon 12 | Plexar-3 | 75.8 | 168 |
| 9 | 75% nylon 12 25% LLPDE | Plexar-3 | 73 | 163 |
| 10 (Control) | Surlyn | Plexar-3 | 40 | NOT TESTED |
| 11 | 55% nylon 12 45% Surlyn | Plexar-3 | 28.8 | 196 |
| 12 | 30% nylon 12 70% Surlyn | Plexar-3 | 31.4 | 200 |

Sample 10 was a control sample wherein food contact layer A contained no nylon 12, but rather was 100% Surlyn. As discussed above, the prior art teaches 100% Surlyn for the food contact-meat adhering layer. But as can be seen from the table, control sample 10 had a seal strength of only 40 IOWP (at the hot temperature of 82° C.), whereas the blends of 75% to 90% nylon 12 by weight either with Surlyn or with Primacor exhibited a much improved seal strength ranging from about 70 to about 76 IOWP (at the hot temperature of 83° C.). Additionally, it is noted that for sample 8, wherein layer A was only nylon 12 free of any blending with LLDPE or with a copolymer such as Primacor or Surlyn, the 83° C. seal strength was about 76 IOWP, which is comparable to the 83° C. seal strength of the blends and much better than the 40 IOWP 83° C. seal strength of control sample 10. Furthermore, it can be seen from samples 11 and 12 at the bottom of the table, that when layer A was a blend and the amount of nylon 12 therein was decreased to 55% and 30%, respectively, the 83° C. seal strength was only around 29 to 30 IOWP, which is not as good as the 40 IOWP of the prior art 100% Surlyn for the "food contact-meat adhering" layer.

EXAMPLE II

Binding Adherence to Food

Bags of several of the film sample types of Example I were tested for binding adherence to a cooked-in meat product. Each bag was stuffed with chicken emulsion, vacuumized, heat-sealed, and cooked at 55° C. for 30 minutes, and then at 60° C. for 30 minutes, and then at 65° C. for 30 minutes, for a total of 90 minutes cooking time, followed by cooling in an ice bath. With film sample types 3 and 8, the procedure was repeated.

A quantitative comparison of the adherence level of several of the samples in relation to that of control sample 10 (the sample wherein the food contact layer was only Surlyn) was determined as follows. After cook-in and cooling, each sample was placed in the jaws of a Scott tester CRE 1000, and the force to pull the bag from the meat was measured at a constant crosshead speed. (Another machine commonly used for such measuring is the Instron model 1122 tester.) The force to pull away control bag film sample 10 was designated as 100%, with the force to pull away the other sample bag films designated as a percent thereof.

All quantitatively tested samples were also qualitatively designated as good, fair, or poor in relation to control sample 10.

TABLE II

| Film Type Sample Number | Food Contact Layer A | FIRST COOK-IN Qualitative Adherence Properties | FIRST COOK-IN Quantitative Adherence Level | REPEAT COOK-IN Qualitative Adherence Properties | REPEAT COOK-IN Quantitative Adherence Level |
|---|---|---|---|---|---|
| Comparison 1 | PER 90% | Poor | 0% | NT* | NT |

TABLE II-continued

| Film Type Sample Number | Food Contact Layer A | FIRST COOK-IN Qualitative Adherence Properties | FIRST COOK-IN Quantitative Adherence Level | REPEAT COOK-IN Qualitative Adherence Properties | REPEAT COOK-IN Quantitative Adherence Level |
|---|---|---|---|---|---|
| 2 | nylon 12 10% Surlyn 80% | Good | 117% | NT | NT |
| 3 | nylon 12 20% Surlyn 70% | Good | 129% | NT | NT |
| 4 | nylon 12 30% Surlyn 75% | Good | 136% | Good | 149% |
| 5 | nylon 12 25% Surlyn 75% | Good | NT | NT | NT |
| 6 | nylon 12 25% Surlyn 75% | Good | NT | NT | NT |
|  | nylon 12 25% Surlyn | Good | NT | NT | NT |
| 8 | nylon 12 | Fair | 22% | Good | 110% |
| 9 | 75% nylon 12 25% LLDPE | Good | 90% | NT | NT |
| 10 (Control) | Surlyn | Good | 100% | NT | NT |

*NT = Not Tested

As also can be seen from Table II, for adherence comparison with films having a known food contact layer made of Surlyn and adherence comparison with the films of the present invention, a comparison sample comprising a 6-layer film having a known food contact layer made of propylene-ethylene random copolymer (PER) was tested. Film having a PER food contact layer is illustrative of another embodiment of the Oberle et al U.S. Pat. No. 4,469,742, mentioned above. It is well known that PER makes a high strength heat-seal. PER, however, unlike a Surlyn food contact layer, does not tend to adhere to a contained meat product during cook-in, which the 0% quantitative adherence of this comparative sample illustrates, as is noted in Table II.

Furthermore, it can be seen from Table II that for all samples wherein layer A was a blend in accordance with one embodiment of the present invention, adherence was qualitatively good, as compared to control sample 10, and percentage wise quantitatively better than control sample 10 for those samples which were quantitatively tested. But for sample 8 wherein layer A was 100% nylon 12 in accordance with another embodiment of the present invention, adherence was inconsistent, i.e. 22% in the first cook-in and 110% in th repeat cook-in, as compared to control sample 10.

What is claimed is:

1. A multiple-layer, cook-in film having a first food contact layer (a) having been subjected to an energetic radiation surface treatment provided by a high energy electron treatment to an extent corresponding to a dosage of up to about 12 MR, said first layer (a) functioning as an adhering layer, and wherein said first layer (a) comprises a polyamide composition.

2. The film of claim 1, wherein in the polyamide composition, the polyamide selected from the group consisting of is nylon 6, nylon 11, nylon 12, nylon 66, nylon 610, nylon 6/9, nylon 6/10, nylon 6/12, nylon 69, nylon 612, a nylon produced from the polycondensation or polyaddition of any of the acid or amine compounds used to produce any of said nylons, a copolymer of any of said nylons, a terpolymer of any of said nylons, or a mixture thereof.

3. The film of claim 1, wherein said polyamide composition is said first layer (a) is selected from (I) a polyamide or (II) a blend comprising about 60% up to about 100% by weight polyamide with about 40% down to about 0% by weight of (i) a polyethylene, or (ii) a copolymer of an alpha-olefin having the formula $RHC=CH_2$ wherein R is H or $C_1$ to $C_8$ alkyl and an alpha,beta-ethylenically unsaturated carboxylic acid.

4. The film of claim 3, wherein in the copolymer of an olefin and a carboxylic acid, the olefin is ethylene and the carboxylic acid is acrylic acid or methacrylic acid.

5. The film of claim 4, wherein the copolymer is a metal salt neutralized ionomer.

6. The film of claim 3, wherein said polyethylene is LDPE, MDPE, HDPE, LLDPE, VLDPE, EMA, EEA, EBA, EVA, or a mixture thereof.

7. The film of claim 1, wherein said film is selected as comprising at least the multilayer film structure: first food contact layer/barrier layer.

8. The film of claim 7, wherein said film is selected as comprising at least the multilayer film structure: first food contact layer/barrier layer/abuse layer.

9. The film of claim 8, wherein said film is selected as comprising at least the multilayer film structure: first food contact layer/shrink layer/barrier layer/abuse layer.

10. The film of claim 1, further including additional layers comprising:
(b) an adhesive layer comprising a copolymer or homopolymer of olefin modified by the provision of functional groups with a relatively strong affinity for the following barrier layer;
(c) a barrier layer comprising a nylon, a polymer or copolymer of vinylidene chloride, or a hydrolyzed ethylene-vinyl acetate copolymer.

11. The film of claim 1, further including additional layers comprising:
(b) a second or shrink layer, melt bonded to said first layer, which comprises an ethylene homopolymer or copolymer selected from linear low density polyethylene (LLDPE), low density polyethylene (LDPE), ethylene-vinyl acetate copolymer (EVA), medium density polyethylene (MDPE), high density polyethylene (HDPE), very low density polyethylene (VLDPE), ethylene-butyl acrylate copolymer (EBA), ethylene-methylacrylate copolymer (EMA), ethylene-ethylacrylate copolymer (EEA), an acid anhydride grafted polyethylene, or a mixture thereof, further provided that the thickness of said second layer is sufficient such that the shrink temperature of the entire multilayer film, when oriented, is substantially controlled by the shrink temperature of said second layer;
(c) a third or adhesive layer, melt bonded to said second layer, which comprises a copolymer or homopolymer of ethylene modified by the provision of functional groups with a relatively strong affinity for the following barrier layer;
(d) a fourth or barrier layer, melt bonded to said third layer, which comprises a polymer or copolymer of vinylidene chloride layer, a hydroloyzed ethylene-vinyl acetate copolymer layer, or both a polymer or copolymer of vinylidene chloride layer and a hydrolyzed ethylene-vinyl acetate layer;
(e) a fifth or adhesive layer of substantially the same composition as said third layer, melt bonded to said fourth layer; and
(f) a sixth or abuse layer comprising (i) LLDPE, EVA, LDPE, HDPE, MDPE, VLDPE, EBA, EMA, EEA or a mixture thereof, or (ii) the same material as said first layer.

12. The film of claim 11, wherein said film is biaxially oriented to an extent corresponding to a biaxial free shrinkage at 185° F. (85° C.) of up to about 55%.

13. A method for improving the heat seal strength of multiple layer, cook-in film having a first food contact layer (a) that functions as an adhering layer, said method comprising (1) providing for said first layer (a) with a polyamide composition (2) extruding said first layer into a multiple layer film, and (3) prior to or after the extruding of said first layer (a), subjecting said first layer (a) to an energetic radiation surface treatment.

14. The method of claim 13, wherein in the polyamide composition, the polyamide selected from the group consisting of is nylon 6, nylon 11, nylon 12, nylon 66, nylon 610, nylon 6/9, nylon 6/10, nylon 6/12, nylon 69, nylon 612, a nylon produced from the polycondensation or polyaddition of any of the acid or amine compounds used to produce any of said nylons, a copolymer of any of said nylons, a terpolymer of any of said nylons, or a mixture thereof.

15. The method of claim 13, wherein said polyamide composition in said first layer (a) is provided by (I) a polyamide or (II) a blend comprising by weight about 60% up to about 100% polyamide with about 40% down to about 0% (i) polyethylene, or (ii) copolymer of an alpha-olefin having the formula $RHC=CH_2$ wherein R is H or $C_1$ to $C_8$ alkyl and an alpha,beta-ethylenically unsaturated carboxylic acid.

16. The method of claim 15, wherein in the copolymer of an olefin and a carboxylic acid, the olefin is ethylene and the carboxylic acid is acrylic acid or methacrylic acid.

17. The method of claim 16, wherein the copolymer is a metal salt neutralized ionomer.

18. The method of claim 15, wherein said polyethylene is LDPE, MDPE, HDPE, LLDPE, VLDPE, EMA, EEA, EBA, EVA, or a mixture thereof.

19. The method of claim 13, wherein said extruding provides for a film comprising at least the multilayer film structure: first food contact layer/barrier layer.

20. The method of claim 19, wherein said extruding provides for a film comprising at least the multilayer film structures: first food contact layer/barrier layer/abuse layer.

21. The method of claim 20, wherein said extruding provides for a film comprising at least the multilayer film structure: first food contact layer/shrink layer/barrier layer/abuse layer.

22. The method of claim 13, wherein said extruding further includes additional layers comprising:
(b) an adhesive layer comprising a copolymer or homopolymer of olefin modified by the provision of functional groups with a relatively strong affinity for the following barrier layer;
(c) a barrier layer comprising a nylon, a polymer or copolymer of vinylidene chloride, or a hydrolyzed ethylene-vinyl acetate copolymer.

23. The method of claim 13, wherein said extruding further includes additional layers comprising:
(b) a second or shrink layer, melt bonded to said first layer, which comprises an ethylene homopolymer or copolymer selected from linear low density polyethylene (LLDPE), low density polyethylene (LDPE), ethylene-vinyl acetate copolymer (EVA), medium density polyethylene (MDPE), high density polyethylene (HDPE), very low density polyethylene (VLDPE), ethylene-butyl acrylate copolymer (EBA), ethylene-methylacrylate copolymer (EMA), ethylene-ethylacrylate (EEA), an acid anhydride grafted polyethylene, or a mixture thereof, further provided that the thickness of said second layer is sufficient such that the shrink temperature of the entire multilayer film, when oriented, is substantially controlled by the shrink temperature of said second layer;
(c) a third or adhesive layer, melt bonded to said second layer, which comprises a copolymer or homopolymer of ethylene modified by the provision of functional groups with a relatively strong affinity for the following barrier layer;
(d) a fourth or barrier layer, melt bonded to said third layer, which comprises a polymer or copolymer of vinylidene chloride layer, a hydrolyzed ethylene-vinyl acetate copolymer layer, or both a polymer or copolymer of vinylidene chloride layer and a hydrolyzed ethylene-vinyl acetate copolymer layer;
(e) a fifth or adhesive layer of substantially the same composition as said third layer, melt bonded to said fourth layer; and (f) a sixth or abuse layer comprising (i) LLDPE, EVA, LDPE, HDPE, MDPE, VLDPE, EBA, EEA, EMA, or a mixture thereof, or (ii) the same material as said first layer.

24. The method of claim 23, wherein said film is biaxially oriented to an extent corresponding to a biaxial free shrinkage at 185° F. (85° C.) of up to about 55%.

25. The method of claim 13, wherein said first layer has been subjected to an energetic radiation treatment provided by a high energy electron treatment to an extent corresponding to a dosage of up to about 12 MR.

* * * * *